United States Patent
Veal et al.

(10) Patent No.: US 8,938,641 B2
(45) Date of Patent: Jan. 20, 2015

(54) METHOD AND APPARATUS FOR SYNCHRONIZING STORAGE VOLUMES

(71) Applicant: Intel Corporation, Santa Clara, CA (US)

(72) Inventors: Bryan E. Veal, Hillsboro, OR (US); Annie Foong, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 292 days.

(21) Appl. No.: 13/628,257

(22) Filed: Sep. 27, 2012

(65) Prior Publication Data
US 2014/0089728 A1   Mar. 27, 2014

(51) Int. Cl.
*G06F 11/00*   (2006.01)
(52) U.S. Cl.
USPC .......................... 714/6.24; 714/6.22; 711/114
(58) Field of Classification Search
None
See application file for complete search history.

(56) References Cited

U.S. PATENT DOCUMENTS

| | | | | |
|---|---|---|---|---|
| 6,816,981 B2* | 11/2004 | Morita et al. | ............... | 714/6.22 |
| 7,370,148 B2* | 5/2008 | Ikeuchi et al. | ............... | 711/114 |
| 2005/0066124 A1* | 3/2005 | Horn et al. | ................... | 711/114 |
| 2008/0276146 A1* | 11/2008 | Hetzler et al. | ............... | 714/746 |

* cited by examiner

*Primary Examiner* — Scott Baderman
*Assistant Examiner* — Jason Bryan
(74) *Attorney, Agent, or Firm* — Chapin IP Law, LLC

(57) ABSTRACT

A disk array redundancy controller ensures integrity of a mirrored or RAID storage array supporting a host system and minimizes recovery time responsive to a storage volume failure by traversing caches of recently written blocks to identify partially flushed stripes of data and recovering the inconsistent stripes on each of the storage volumes based on a master copy derived from the scan of all pre-failure caches of the storage array. The storage array employs nonvolatile caches in conjunction with solid state drive (SSD) storage volumes, allowing post-failure recovery of recently written blocks. A cache depth at least sufficient to store the largest stripe, or set of blocks, from the host ensures recovery of the entire stripe from a collective scan of the caches of all storage volumes of the storage array.

20 Claims, 6 Drawing Sheets

METHOD AND APPARATUS FOR SYNCHRONIZING STORAGE VOLUMES

Solid state drives (SSDs) are increasing in popularity over traditional hard disk drives (HDDs) for several reasons. SSDs provide up to 66-percent faster PC responsiveness compared to hard drives, allowing faster boot-up, application launch, and re-loading. SSDs have no moving parts for higher reliability and longer life span. SSDs are sufficiently rugged enough to withstand bumps and shocks without data loss due to a "head crash" common with the close physical tolerance between a read/write head and conventional HDD media surface, and SSDs have lower power consumption which extends battery life. SSDs are therefore becoming popular as suitable replacements for the HDD as the primary mass storage device serving the host.

BRIEF DESCRIPTION OF THE DRAWINGS

The foregoing and other features will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
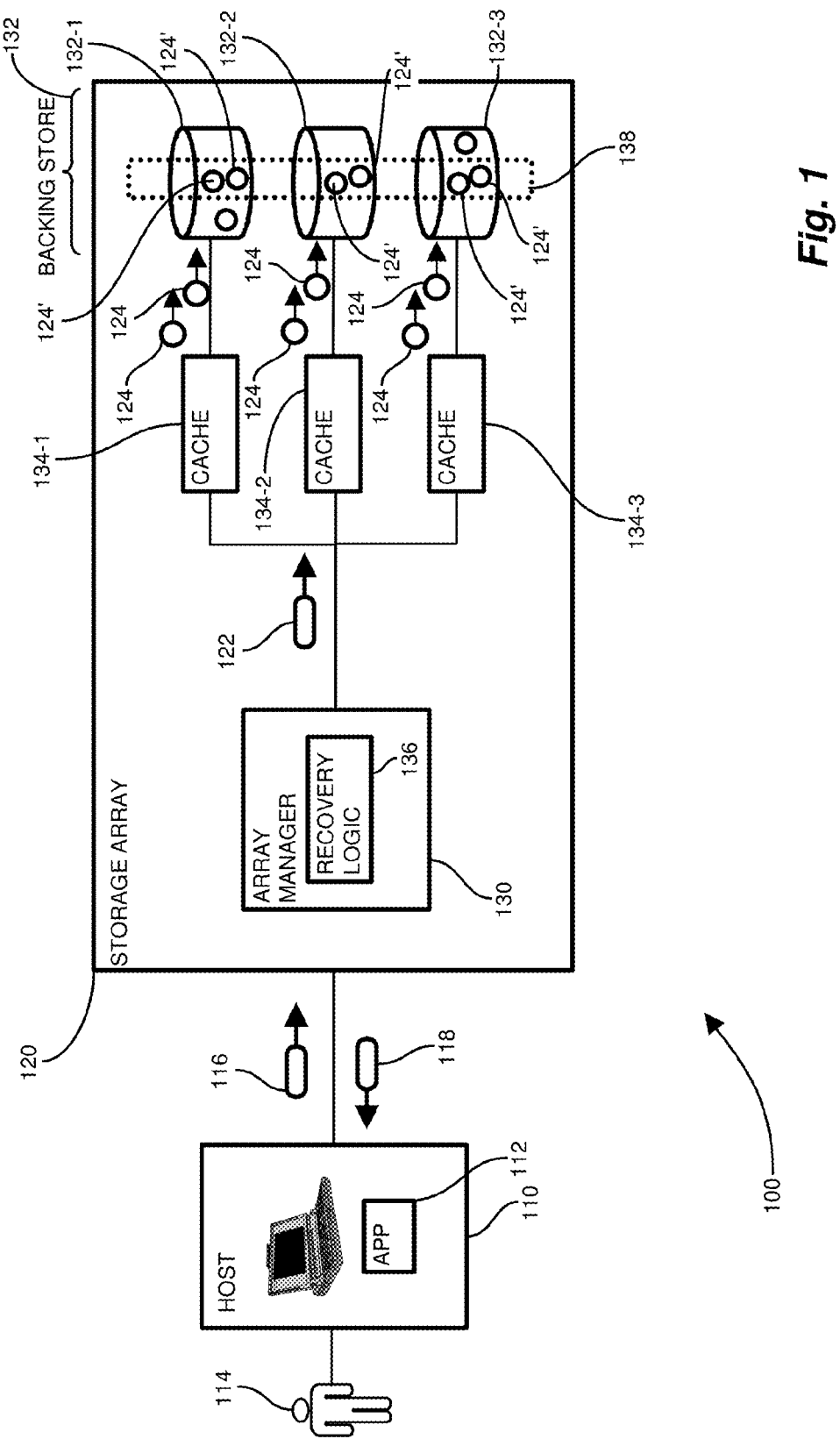
FIG. 1 is a context diagram of a storage environment suitable for use with configurations herein.

A disk array redundancy manager ensures integrity of a mirrored or parity-based storage array supporting a host system and minimizes recovery time responsive to a storage volume failure by traversing caches of recently written blocks to identify incompletely or partially flushed stripes of data and recovering the inconsistent stripes on each of the storage volumes based on a master copy derived from a scan of pre-failure caches of the storage array. The storage-array employs non-volatile caches in conjunction with solid state drive (SSD) storage volumes, allowing post-failure recovery of consistency of recently written blocks. A cache depth at least sufficient to store the largest stripe, or set of blocks, from the host ensures recovery of the entire stripe from a collective scan of the caches of all storage volumes of the storage array.

Such SSDs are equally advantageous in disk array configurations, in which multiple storage volumes cooperatively provide redundancy by mirroring or RAID (Redundant Array of Independent Disks) configuration of the array. In such an arrangement, each storage volume typically employs a cache for flushing host writes to the storage volume. In a recovery scenario, the cache may also provide information about the most recently written blocks to the storage volume to aid in recovery and integrity checks.

When writing stripes to a disk array with mirror (e.g. RAID level 1) or parity-based redundancy (e.g. RAID levels 5 or 6), a concurrent multi-disk failure (e.g. a power outage) may leave the array inconsistent. That is, some portions of a stripe may have been written while others have not. With mirroring, the data will differ, and reads would yield unpredictable data. With parity-based redundancy, the parity as stored will be incorrect. Conventional approaches have described similar scenarios as the so-called "write-hole problem." When the array is brought back online, stripes may be made consistent by reading them correcting the mirror copy or parity. Without knowing which stripes are inconsistent, an array manager (e.g. a RAID controller or host-based RAID software) must read and check the entire array. This degrades performance during the check, and increases the risk of data loss if a failure occurs before the check is completed.

Configurations herein are based, in part, on the observation that conventional approaches to recovery scan the entire array of the storage array to ensure integrity following a failure. The time of the recovery scan can be substantial. Performance may degrade during the recovery scan, and a volume failure before the scan is complete may result in data corruption. Unfortunately, conventional approaches to array recovery for RAID and multi-volume arrays (i.e. mirrored) suffer from the shortcoming that the identification of inconsistent stripes which may need recovery is not known; hence the entire array must be scanned. Accordingly, configurations herein substantially overcome the above-described shortcomings by employing a non-volatile write buffer for each volume in the storage array, and identifying the set of suspect, or partially written, stripes such that only the suspect stripes need be checked for inconsistency and recovery following an unexpected failure, power loss, or other ungraceful shutdown.

Accordingly, configurations herein reduce the scope of the consistency check when component drives in an array have individual NVM caches. When configured as write caches, they will contain recently-written Logical Block Addresses (LBAs) as part of the cache metadata. If the array manager retrieves the list of LBAs from the metadata of all the caches, it need only perform consistency checks on those stripes rather than the whole array. With more detailed metadata, discussed below, the scope of the consistency check may be reduced even further.

FIG. 1 is a context diagram of a storage environment suitable for use with configurations herein. Referring to FIG. 1, in the storage environment 100, a host 110 executes applications 112 responsive to users 114 for providing computing services. The storage array 120 is responsive to the host 112 for performing data storage 116 and retrieval 118 operations on behalf of the application 112. The storage array 120 provides non-volatile (NV) storage for the host 112, and may also provide redundancy, integrity and recovery functions from an array manager 130 or redundancy controller.

The array manager 130 performs integrity and recovery functions such as mirroring and RAID storage techniques via a plurality of storage volumes 132-1 . . . 132-3 (132 generally, collectively referred to as a backing store) and corresponding caches 134-1 . . . 134-3. Depending on the configuration, for example, any suitable non-volatile memory may be employed, including but not limited to NAND flash memory, phase change memory (PCM), electrically erasable programmable read only memory (EEPROM), or any other type of non-volatile memory device such as Phase Change Memory and Switch (PCMS), Nanowire and Ferroelectric Transistor RAM (FeTRAM) based implementations. Traditional or legacy magnetic drives may also be employed. The array manager 130 satisfies write requests 122 from the host 110 by writing blocks 124 of the requests 122 to the storage volumes 132 according to redundancy and recovery logic 136 of the array manager 130, such as mirroring or RAID. Though not pictured, without limitation, the array manager 130 and recovery logic 136 may be instead implemented as software running on host 110. The storage volumes 132 may be any suitable media, such as NAND memory common in solid state drives (SSDs), magnetic hard disk drive (HDD), (etc.). The storage volumes 132 employed with the disclosed configuration benefit from having non-volatile memory (NVM) employed as the cache medium to facilitate integrity checks as disclosed herein, because recently written blocks 124 remain available following a power failure. Such storage volumes 132 may include a communications interface that may be used to connect to a computer or other device using a communication protocol. Examples of communication protocols that may be used include Universal Serial Bus (USB), Serial Advanced Technology Attachment (SATA), Small Computer System Interconnect (SCSI), Fibre Channel, Peripheral Component Interconnect (PCI) or PCI Express (PCI-e).

Each storage volume 124 also has a corresponding cache 134 which receives the blocks 124 to be written. Depending on the recovery logic, a set of blocks 134' is written to each storage volume 132, which may be less than all the blocks of the request 122 depending on the recovery logic 136 (i.e. RAID). The set of blocks 124 across all queues 134 collectively defines stripe 138 of data, which is an atomic unit adapted for integrity and recovery checking by the recovery logic 136 may correspond to a single file or record generated by a single application, or may be of fixed size without regard to application.

Configurations herein reduce the set of possible inconsistent stripes 138 for an array consistency check by checking only stripes found in NVM caches 134, rather than the entire array or storage array 120. The approach further reduces the set of possibly inconsistent stripes 138 by tagging which cache blocks 124 were written due to writes 116 from the host 110, rather than reads. The set is further reduced by selecting only LBAs for dirty cache blocks in write-back caches. Recovery logic retrieves the list of LBAs found in each cache from cache metadata to generate the list of stripes to check for consistency, and temporarily preventing cache evictions to guarantee data and metadata for partially written stripes which may belong to incompletely-written stripe remains in cache. For non-host managed caches (e.g. in-line caches or hybrid drives) (drives having a non-volatile cache comprised of flash memory or other non-volatile medium), new commands may be provided to retrieve metadata needed to reduce the set of possibly inconsistent stripes.

Figure 2:
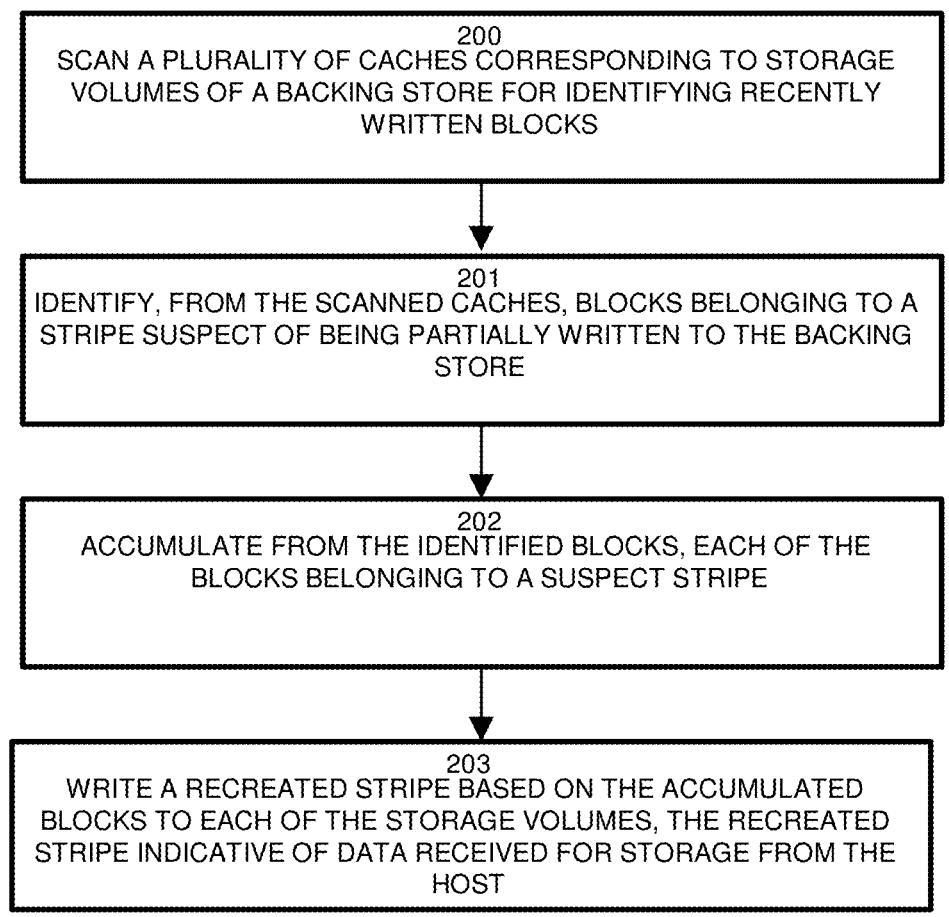
FIG. 2 is a flowchart of storage integrity management as disclosed herein.

FIG. 2 is a flowchart of storage integrity management as disclosed herein. Referring to FIGS. 1 and 2, the method of ensuring integrity of redundant storage includes, at step 200, scanning a plurality of caches 134 corresponding to storage volumes 132 of a storage array 120 for identifying recently written blocks 124'. The recovery logic 136 identifies, from the scanned caches 134, blocks 124 belonging to a stripe 138 suspect of being partially written to the storage array 120, as depicted at step 201. The recovery logic 136 accumulates, from the identified blocks 124, each of the blocks 124' belonging to a suspect stripe 138, as shown at step 202. Based on a determination of inconsistent stripes, the recovery logic 136 writes a recreated stripe 138 based on the accumulated blocks to each of the storage volumes 132, in which the recreated stripe is indicative of data received for storage from the host 110, as shown at step 203. Various features discussed below minimize the extent of the integrity check by reducing the suspect stripes to the identified partially written stripes.

Configurations herein take note of the trend that Non-Volatile Memory (NVM) is increasingly used to cache slower, higher-capacity drives. Many such caches are implemented at the block level, where data blocks in the cache 134 correspond to blocks 124' on disk. Such caches 134 may be host-managed, built in to a "hybrid drive," or placed in-line between the host 110 and the drive volume 132. When drives 132 comprise a redundant array (e.g. RAID), NVM caches 134 may be applied to the entire array, or individual drives. Individual caches per drive are advantageous in that they are also redundant along with the drives—a single cache failure would not result in data loss.

Such caches 134 may also be used to improve the time taken to check and repair the array consistency after a system failure, such as a power outage. If the array manager 130 can determine the addresses (e.g. LBAs) for blocks which have been written most recently, it only needs to check stripes containing these blocks, since these are the only blocks which may be part of an partially-written, inconsistent stripe. While underlying unmodified commodity drives may not be able to determine which blocks may have been written recently, this ability may be supported instead by the caches.

In the examples that follow, a stripe 138 is defined as a set of related blocks 124, where each block is stored in a separate constituent volume 132, and where at least one of the blocks contains redundant data. A stripe ID is metadata for blocks in a stripe such that the stripe may be identified by any such block. For example, in a RAID array with identical constituent volumes, the LBA of each block of a stripe is the same, so any block's LBA may be used as the stripe ID. In a cache, a block address refers to a portion of backing volume, such as a contiguous range of one or more LBAs. The stripe ID may therefore be derived from the block address.

Figure 3:
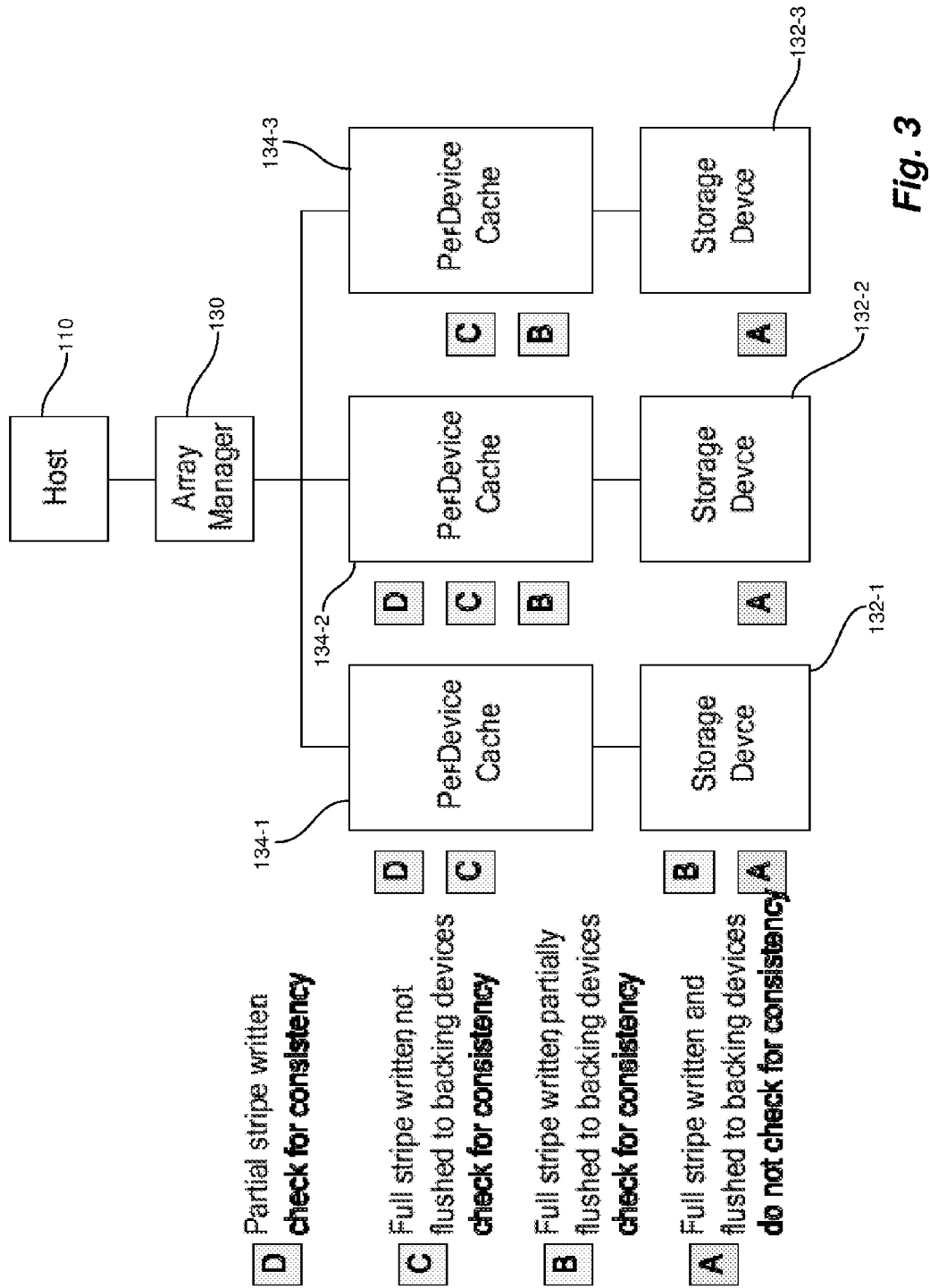
FIG. 3 is an example of storage integrity management in the environment of FIG. 1.

FIG. 3 is an example of storage integrity management in the environment of FIG. 1. Referring to FIGS. 1 and 3, there are several approaches by which the caches 134 may be employed to narrow down the set of stripes 138 to check for consistency. Generally, if the cache 134 can guarantee that it stores at least the block addresses of all recently-written data, and that the history of such addresses is large enough so that no addresses are lost until the full stripe write is complete, then it is sufficient to check the stripes 138 containing these blocks 124 rather than the entire array.

One approach is to check all stripes 138 where any portion of the stripe 138 is present in a cache 134. For write caches, all recently-written data is present in each cache. Thus, checking all stripes 138 with blocks 124 represented in any cache 134 would be sufficient. To further reduce the set of stripes, the caches 134 may track which blocks have been written to cache due to writes from the host 110, versus reads from the backing drive 132 (i.e. only writes may be different from the data on the storage array 132). The caches may track this information explicitly.

Alternatively, the caches may utilize metadata already tracked for the purpose of caching. Write-back caches already track which blocks are "dirty," that is, which blocks have been written by the host but have not yet been written to the backing drive. Given a caching algorithm which writes back less-recently written blocks, the set of dirty blocks would contain the most-recently written blocks. Thus, the array manager 130 need only check stripes containing dirty blocks in the cache to guarantee the array consistency. Care must be taken to prevent records of recently-written blocks from being lost, either by temporarily preventing write-backs (switching the block from dirty to clean), or logging block address of blocks that have been recently written back. This is performed until it can be safely assumed that all blocks 124 of the same stripe 138 have been safely written to the other caches 134.

Figure 4:
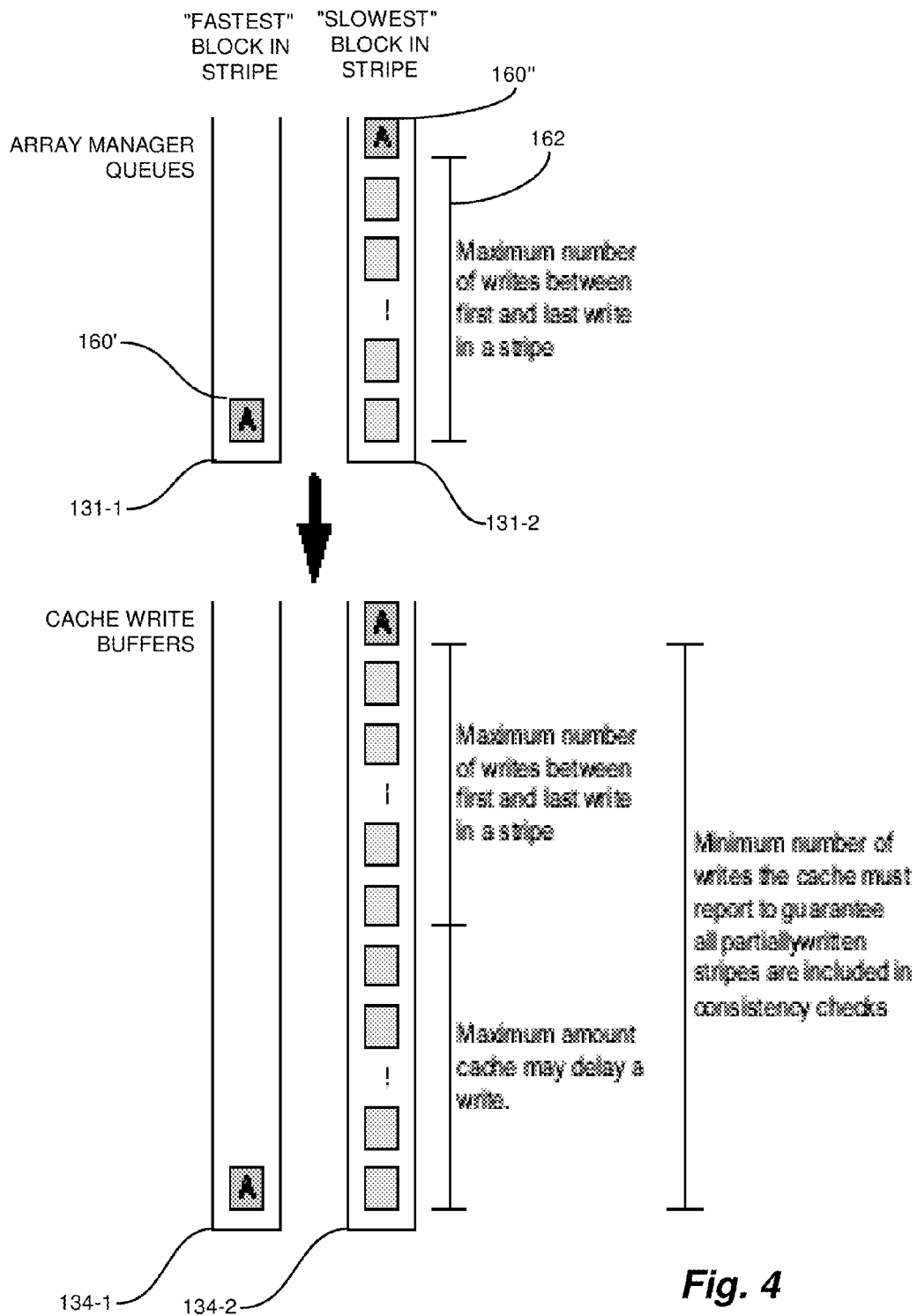
FIG. 4 shows a sequence of ensuring integrity of redundancy storage as in FIG. 2.

FIG. 4 shows a sequence of ensuring consistency of redundancy storage as in FIG. 2. Without constraints, there is no way for independent caches 134 to guarantee that it keeps a set of recently-written block addresses long enough to avoid losing track of an partially-written stripe 138. That is, guaranteeing that there is no gap between constituent blocks 124 of the stripe 138, where one set of blocks has expired from tracking, but another set has yet to be written. A failure during this gap would result in the stripe being missed during the consistency check. Referring to FIGS. 1 and 4, constituent block A, shown as 160' and 160'', occupies array manager queues 131-1 and 131-2, corresponding respectively to caches 134-1 and 134-2, respectively.

Disclosed in FIG. 4 is an approach to prevent such gaps, which relies on guarantees by the caches 134 and the array manager 130. First, the cache 134-N ensures that when it receives a request to write a cache block, that it will at least commit the write before committing at most a fixed number of other cache block writes. In other words, the distance a write may be delayed by the cache is bound by a fixed amount 162.

Second, the array manager 130 ensures that writes to multiple targets be issued with at most a fixed number of write commands to the last device after the first write command is issued to the first device (volume 132). Thus, the cache manager must provide some synchronization of writes to multiple targets. If the cache device can track at least the sum of the maximum number of intervening writes guaranteed by both the cache and the array manager, then any partially-written stripe 138 will have a record (i.e. block 124) in at least one of the caches 134. Thus, on failure, the array manager 130 can reliably limit the number of partially-written stripes 138 that it checks for consistency.

Figure 5:
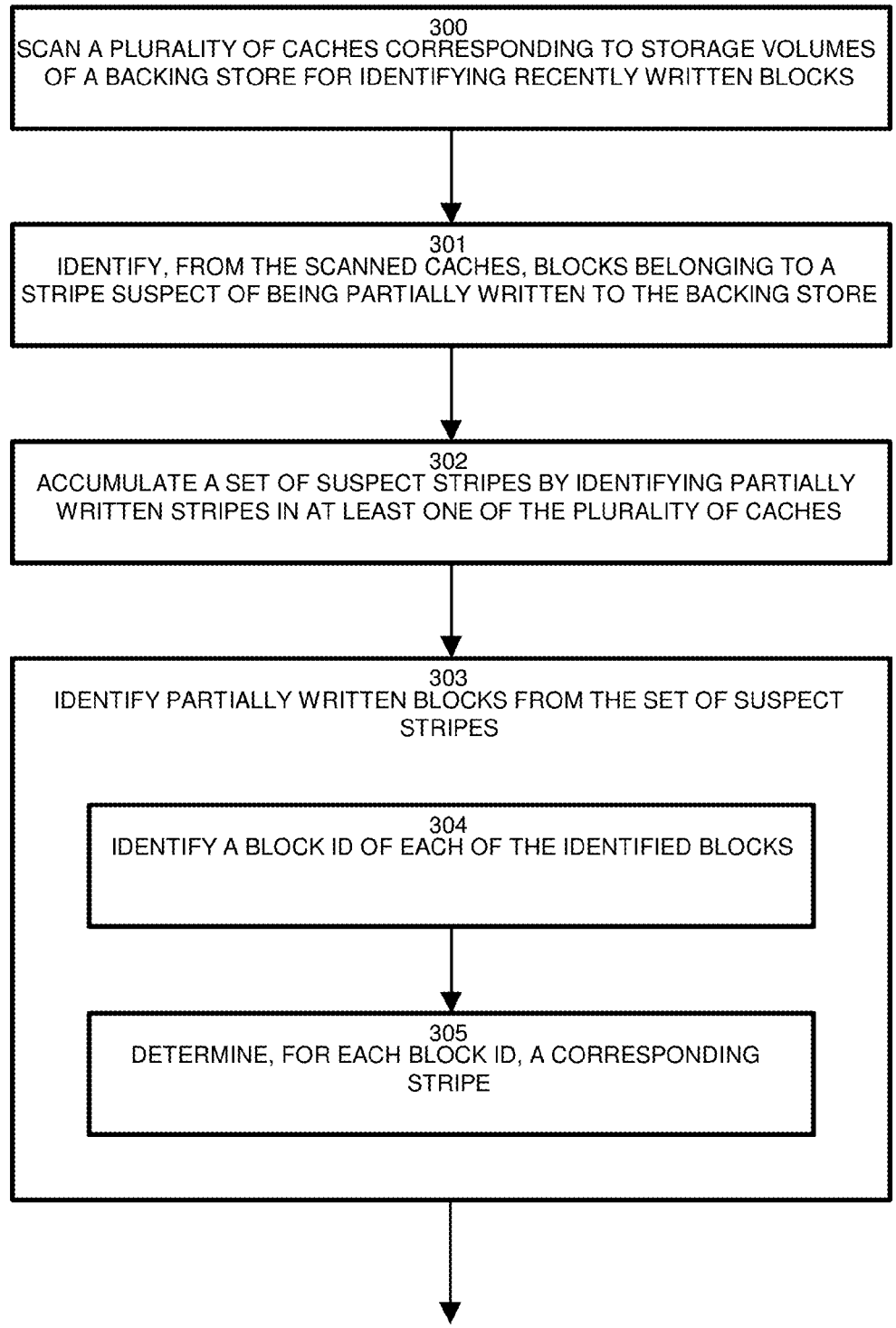
FIGS. 5 and 6 are a flowchart of ensuring the integrity of redundancy storage as in FIG. 4.
Figure 6:
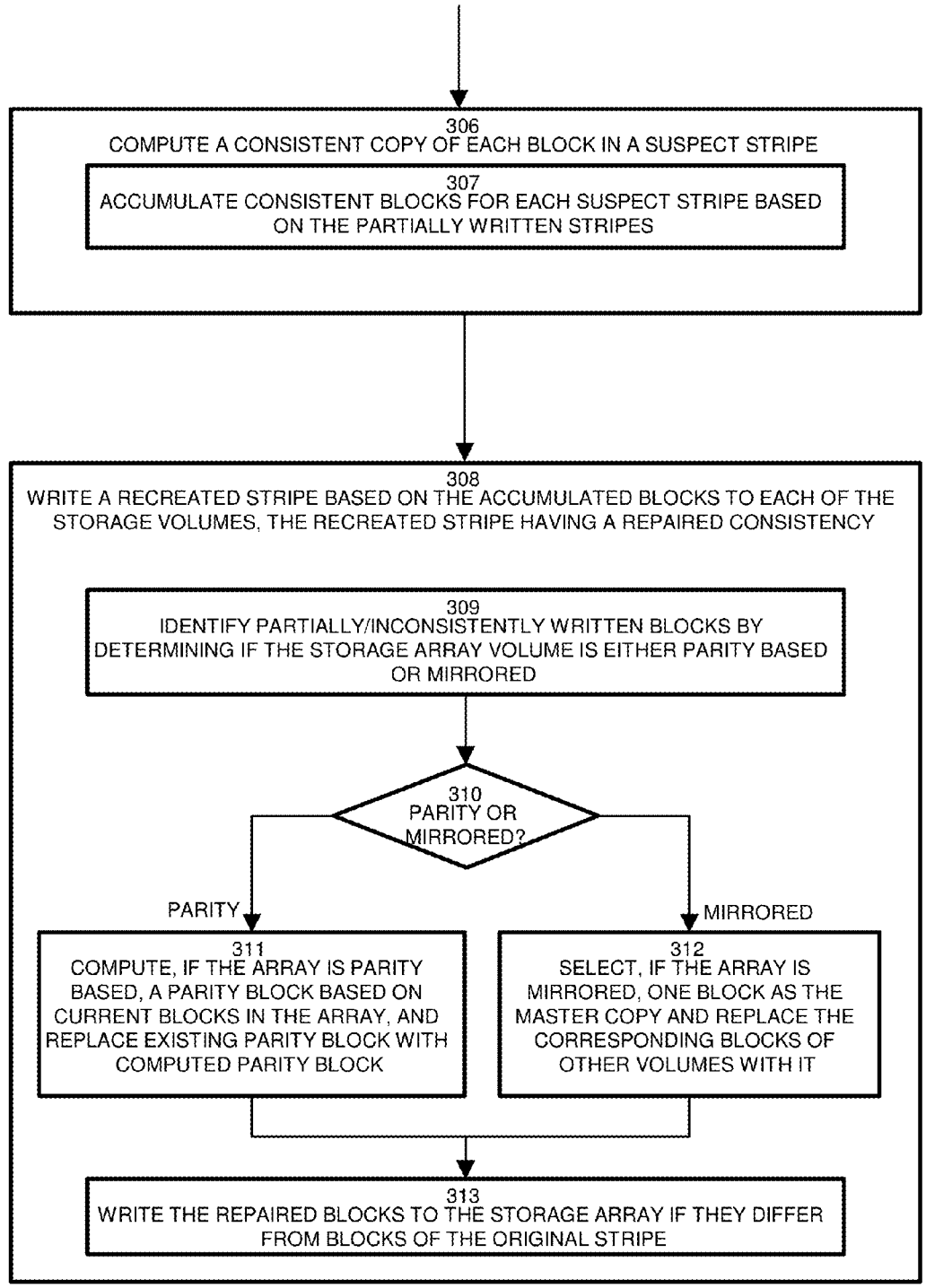

FIGS. 5 and 6 are a flowchart of ensuring the integrity of redundancy storage as in FIG. 4. Referring to FIGS. 1 and 4-6, at step 300, the method of ensuring integrity of redundant storage includes, at step 300, scanning a plurality of caches 134 corresponding to storage volumes 132 of a storage array 120 for identifying recently written blocks 124'. Scanning the caches 134 includes traversing each of a plurality of the device caches 134, such that each device cache 134 corresponds to a non-volatile storage device 132 of the storage array 120. The traversal includes reading a logical block address (LBA) from a mapping 135 of each cached block 124 in the caches 134, and computing a change set indicative of data blocks suspect of inconsistency based on a per device cache 134. Each cache 134 therefore corresponds to a volume 132 of the storage array 120. The set of blocks in the suspect stripe usually define a sequence of atomic data from the host, such as a write request from an application 112, in which the atomic data is for storage as a single unit.

The recovery logic 136 identifies, from the scanned caches 134, blocks 124 belonging to a stripe 138 suspect of being partially written to the storage array 120, as depicted at step 301. The recovery logic 136 accumulates a set of suspect stripes by identifying partially written stripes 138 in at least one of the plurality of caches 134, as depicted at step 302. The stripe 138 is a set of blocks of the atomic data for redundant storage across a plurality of the storage volumes 132. The recovery logic 136 identifies partially written blocks 124 from the set of suspect stripes, as shown at step 303. Generally, redundancy schemes such as RAID and mirroring will write duplicate blocks to a plurality of the caches 134. In a particular configuration, cache size 140 is based on a write buffer of the host 110 such that each partial write of an update set is represented in a change set of blocks 124, thus ensuring that each block of the suspect stripe is still present. This approach employs setting cache size based on a write buffer of the host such that at least one update block of each cache T overlaps with an update block in one of the other of the plurality of caches.

In the disclosed example, each block 124 has a logical block address (LBA) indicative of a location on the storage array 120 (i.e. a physical volume location) and a stripe ID indicative of the set of blocks 124 in the stripe 138, thus enabling identification of the stripe from any of the blocks in the stripe 138. Identifying the suspect blocks of the stripe therefore further include identifying a block ID of each of the identified blocks, as shown at step 304, and determining, for each block ID, a corresponding stripe 138, as disclosed at step 305.

The recovery logic 136 computes a consistent copy of each block in a suspect stripe, as depicted at step 306. The consistent copy is employed for restoring parity and/or block content based on whether the storage array 120 is parity based or mirrored, discussed further below. This includes, at step 307, accumulating consistent blocks 124 for each suspect stripe 138 based on the partially written stripes.

If any of the stripes are inconsistent, i.e. in the case of a parity-based volume, the parity is incorrect, or in the case of mirroring, the mirrored blocks are dissimilar, then the recovery logic writes a recreated stripe 138 based on the accumulated blocks 124 to each of the storage volumes 132, such that the recreated stripe is consistent, as depicted at step 308. This includes comparing the blocks 124 of the suspect stripe to corresponding blocks 124' on the storage array 120, and writing the recreated stripe if blocks of the stripe have been changed to correct consistency.

The recovery logic 136 identifies partially or inconsistently written blocks at step 309, by determining, based on the check at step 310, if the storage array 120 volumes are either parity based or mirrored. The recovery logic 136 computes, if the array is parity based, a parity block based on current blocks in the array, and replacing existing parity block with the newly recomputed, consistent parity block that matches (i.e. is consistent with) the remainder of the stripe, as depicted at step 311, If the array is mirrored, the recovery logic 136 selects one block as the master copy and replaces the other corresponding blocks on other volumes with it, as shown at step 312. Upon determining a synchronization mismatch, the recovery logic 136 writes the repaired blocks to the storage array 120 if they differ from blocks of the original stripe 138, as shown at step 313.

Cache sizing is significant because, without constraints, there is no way for independent caches to guarantee that it keeps a set of recently-written block addresses long enough to avoid losing track of an partially-written stripe. That is, guaranteeing that there is no gap between constituent blocks of the stripe, where one set of blocks has expired from tracking, but another set has yet to be written. A failure during this gap would result in the stripe being missed during the consistency check. A method to prevent such gaps relies on guarantees by the caches and the array manager 130. First, the cache 134 must guarantee that when it receives a request to write a cache block, that it will at least commit the write before committing at most a fixed number of other cache block writes. In other words, the distance a write may be delayed by the cache is bound by a fixed amount. Second, the array manager 130 must guarantee that writes to multiple targets be issued with at most a fixed number of write commands to the last device after the first write command is issued to the first device. Thus, the cache manager must provide some synchronization of writes to multiple targets.

If the cache device can track at least the sum of the maximum number of intervening writes guaranteed by both the cache and the array manager, then any partially-written stripe will have a record in at least one of the caches. Thus, on failure, the array manager can reliably limit the number of partially-written stripes that it checks for consistency.

Those skilled in the art should readily appreciate that the programs and methods defined herein are deliverable to a computer processing and rendering device in many forms, including but not limited to a) information permanently stored on non-writeable storage media such as ROM devices, b) information alterably stored on writeable non-transitory storage media such as floppy disks, magnetic tapes, CDs, RAM devices, and other magnetic and optical media, or c) information conveyed to a computer through communication media, as in an electronic network such as the Internet or telephone modem lines. The operations and methods may be implemented in a software executable object or as a set of encoded instructions for execution by a processor responsive to the instructions. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. A method of ensuring integrity of redundant storage comprising:
   scanning a plurality of caches corresponding to storage volumes of a storage array for identifying recently written blocks;
   identifying, from the scanned caches, blocks belonging to a stripe that is suspect of being partially written to the storage array;
   accumulating from the identified blocks, each of the blocks belonging to the suspect stripe; and
   writing a recreated stripe of blocks based on the accumulated blocks to each of the storage volumes, the recreated stripe having consistency repaired.

2. The method of claim 1 further comprising comparing the blocks of the suspect stripe to the blocks of the recreated stripe, and writing the recreated stripe based on a mismatch of the blocks of the suspect stripe.

3. The method of claim 2 further comprising:
   accumulating a set of suspect stripes by identifying partially written stripes in at least one of the plurality of caches.

4. The method of claim 3 further comprising limiting the accumulated set to stripes to stripes having at least one block remaining in one of the plurality of caches.

5. The method of claim 4 further comprising setting cache size based on a write buffer of the host such that each partial write of an update set is represented in a change set of blocks recently written.

6. The method of claim 5 further comprising setting cache size based on a write buffer of the host such that at least one update block of each cache overlaps with an update block in one of the other of the plurality of caches.

7. The method of claim 2 wherein the blocks of the suspect stripe define a sequence of atomic data from the host, the atomic data for storage as a single unit.

8. The method of claim 7 wherein the suspect stripe is a set of blocks of the atomic data for redundant storage across a plurality of storage volumes.

9. The method of claim 1 further comprising:
   identifying a block ID of each of the identified blocks;
   determining, for each block ID, a corresponding stripe; and
   generating a master copy of the suspect stripe by eliminating duplicate blocks from the identified blocks and aggregating blocks corresponding to the suspect stripe, the master copy representative of correct data received from the host for storage on the storage array.

10. The method of claim 9 wherein each identified block has a logical block address (LBA) indicative of a location on one of the storage volumes of the storage array defining a backing store and a stripe ID.

11. The method of claim 9 further comprising:
    identifying partially written stripes by determining if the storage array is either parity based or mirrored;
    computing, if the array is parity based, a parity block replacing an existing parity block of the stripe;
    selecting, if the array is mirrored, one block as a master copy, and replacing the other blocks of the stripe corresponding to the master copy; and
    writing the blocks of the master copy of the suspect stripe to the storage array.

12. The method of claim 1 wherein scanning further comprises traversing each of a plurality of device caches to identify a change set indicative of cached data blocks suspect of inconsistency, each device cache corresponding to a non-volatile storage device volume of the storage array, traversing including reading a LBA (Logical Block Address) of each cached data block in the the device caches, and computing the change.

13. A computing apparatus for storing data comprising:
    an array manager for scanning a plurality of caches corresponding to storage volumes of a storage array for identifying recently written blocks received based on requests from a host;
    recovery logic for identifying, from the scanned caches, blocks belonging to a stripe that is suspect of being partially written to the storage array;
    a memory for accumulating from the identified blocks, each of the blocks belonging to the suspect stripe; and
    the recovery logic configured for writing a recreated stripe of blocks based on the accumulated blocks to each of the storage volumes, the recreated stripe indicative of data received for storage from the host.

14. The apparatus of claim 13 wherein the recovery logic is configured to:
    compare the blocks of the suspect stripe to the blocks of the recreated stripe, and
    write the recreated stripe of blocks based on a detected mismatch between the blocks of the suspect stripe and the blocks of the recreated stripe.

15. The apparatus of claim 14 wherein the recovery logic is further configured to:
    accumulate a set of suspect stripes by identifying partially written stripes in at least one of the plurality of caches; and
    identify partially written stripes from the set of suspect stripes.

16. The apparatus of claim 15 wherein the storage array has a cache size based on a write buffer of the host such that at least one update block of each cache overlaps with an update block in one of the other of the plurality of caches.

17. The apparatus of claim 13 wherein the recovery logic is configured to synchronize the volumes of the storage array by:
    identifying partially written stripes by determining if the storage array is either parity based or mirrored;

computing, if the array is parity based, a parity block replacing the existing parity block of the stripe;
selecting, if the array is mirrored, one block as the master copy, replacing the other blocks of the stripe; and
writing the blocks of the master copy of the suspect stripe to the storage array.

18. At least one non-transitory computer readable medium having instructions encoded thereon for performing a method of ensuring integrity of redundant storage, the instructions when executed on a storage array device cause the computing device to perform a method comprising:
  scanning a plurality of caches corresponding to storage volumes of a storage array for identifying recently written blocks;
  identifying, from the scanned caches, blocks belonging to a stripe that is suspect of being partially written to the storage array;
  accumulating from the identified blocks, each of the blocks belonging to the suspect stripe;
  repairing consistency of the blocks of the suspect stripe; and
  based on a comparison of the repaired blocks and the blocks of the suspect stripe, writing a recreated stripe based on the accumulated blocks to each of the storage volumes, the recreated stripe having repaired consistency.

19. A computer system comprising;
  an array manager for scanning a plurality of caches corresponding to storage volumes of a storage array for identifying recently written blocks received based on requests from a host;
  recovery logic for identifying, from the scanned caches, blocks belonging to a stripe that is suspect of being partially written to the storage array;
  a memory for accumulating from the identified blocks, each of the blocks belonging to the suspect stripe;
  the recovery logic configured for writing a recreated stripe based on the accumulated blocks to each of the storage volumes, the recreated stripe indicative of data received for storage from the host; and
  a display to display data read from the storage array.

20. The computer system of claim 19 wherein the apparatus further comprises a backing store supporting the computer system, the backing store for providing non-volatile mass storage for the computer system.

* * * * *